United States Patent [19]

Thomas

[11] Patent Number: 4,722,590
[45] Date of Patent: Feb. 2, 1988

[54] JOINTING ARMOURED SUBMARINE CABLES

[75] Inventor: Christopher D. Thomas, Woodbridge, England

[73] Assignee: British Telecommunications, Great Britain

[21] Appl. No.: 594,881

[22] Filed: Mar. 21, 1984

[30] Foreign Application Priority Data

Mar. 23, 1983 [GB] United Kingdom ................ 8308011

[51] Int. Cl.⁴ .................................................. G02B 6/44
[52] U.S. Cl. .................................................... 350/96.23
[58] Field of Search .............. 350/96.23, 96.20, 96.21, 350/96.22; 174/89, 93, 70 S

[56] References Cited

U.S. PATENT DOCUMENTS

| | | | |
|---|---|---|---|
| 3,296,363 | 1/1967 | Laudig et al. ............................ | 174/89 |
| 3,502,788 | 8/1970 | Albert .................................... | 174/88 |
| 3,673,314 | 6/1972 | Zimmermann et al. ................ | 174/89 X |
| 3,982,060 | 4/1976 | Avery et al. ........................... | 174/89 X |
| 4,156,554 | 5/1979 | Aujila .................................... | 174/89 X |
| 4,156,830 | 5/1985 | Guazzo .................................. | 350/96.23 |
| 4,336,977 | 6/1982 | Monaghan et al. .................... | 350/96.23 |
| 4,398,793 | 8/1983 | Ohta et al. ............................. | 350/96.23 |
| 4,427,262 | 1/1984 | Oldham ................................. | 350/96.23 |
| 4,447,121 | 5/1984 | Cooper et al. ......................... | 350/96.20 |
| 4,534,617 | 8/1985 | Kloots et al. .......................... | 350/96.2 |
| 4,576,437 | 3/1986 | Ohta et al. ............................. | 350/96.20 |

FOREIGN PATENT DOCUMENTS

| | | | |
|---|---|---|---|
| 0067673 | 12/1982 | European Pat. Off. ......... | 350/96.23 |
| 627171 | 2/1936 | Fed. Rep. of Germany ........ | 174/93 |
| 926619 | 3/1955 | Fed. Rep. of Germany ... | 350/96.23 |
| 2201505 | 1/1972 | Fed. Rep. of Germany ... | 350/96.23 |
| 856546 | 6/1940 | France ............................... | 174/70 S |
| 2183968 | 12/1973 | France ............................... | 174/89 |
| 1422947 | 1/1976 | United Kingdom ................ | 174/89 |

*Primary Examiner*—William L. Sikes
*Assistant Examiner*—Frank González
*Attorney, Agent, or Firm*—Nixon and Vanderhye

[57] ABSTRACT

A termination for the armour (11) of an armoured submarine cable at a repeater housing comprises concentric sleeves (12, 13) which are swaged together to grip the armour (11) there between. The termination can be mounted in an adjustable position relative to a connector tube (15) which forms part of the repeater housing. The invention has particular application in jointing armoured optical fibre submarine cables.

19 Claims, 7 Drawing Figures

JOINTING ARMOURED SUBMARINE CABLES

BACKGROUND OF THE INVENTION

This invention relates to the jointing of armoured submarine cables and, more particularly, to the jointing of the armour of a submarine optical fibre cable.

For the understanding of this invention, it is convenient to regard an armoured submarine cable as a core surrounded by armour. The core includes transmission elements, which may be optical fibres, strengthening members, insulation and a water seal capable of withstanding the pressure at the depth of operation. Thus, the core, which is complete in itself, provides all the functions needed for transmission.

When it is used in shallow water the cable may be subject to tensile stress; for example, if it is fouled by anchors. Such tensile stress can be in the region of 70 tons. It is important that tensile stress is not allowed to lead to elongation of the core. In the case of cores whose transmission elements are optical fibres this is particularly important because of their high susceptibility to damage by elongation. It is conventional to armour the core so that it is better able to resist tension. The armour usually comprises single or multi start helices of tensile wires wound round the core. Most often the armour comprises one or two such layers. If the cable is pulled, the tension is taken by the armour and relatively little, if any, is transmitted to the core.

Since submarine cables extend for many hundreds of kilometers there are necessarily many joints. Each joint is conveniently considered as two elements, i.e., the core-joint through which transmission occurs and the armour-joint which transmits tension and protects the core-joint from deleterious effects of tension. The core-joint is made in accordance with the technology of the core and it is usually enclosed in an injection moulded polyethylene envelope. This invention is not concerned with the core-joint.

Known armour-joints include the following:

(i) a cone splice wherein the armour wires are brought through a hollow cone and bent back over its outer surface;

(ii) a barrel splice wherein the armour wires are passed through a common sleeve from opposing directions and bent back over its outer surface;

(iii) a ring splice wherein each armour wire is passed individually through a hole in a common ring, being secured therein by a terminal ferrule; and (iv) an overlay splice wherein a first set of armour wires is wound helically as an outer layer over the second set of armour wires as an inner layer for an overlap distance of, typically, 8 m, the effect of tension in use being to reduce the internal diameter of the outer layer so clamping it onto the inner layer.

Both the cone and the barrel splices have been found to suffer from a lack of strength where the armour wires are bent back. Such joints will carry a significantly reduced tensile load in comparision with unjointed armour wires. The ring splice, in practice, has also been found to suffer from a lack of strength because of the difficulty of installing the individual terminal ferrules at exactly equivalent positions at the ends of each of the armour wires. Any tensile load may not be evenly distributed, as a result, between the armour wires. Lastly, the overlay splice is particularly subject to elongation under load which is inseparable from the reduction in internal diameter. Elongation of the armour-joint can clearly affect the proportion of the tensile load transferred to the core and can lead to elongation of the core which, as mentioned above, can be extremely undesirable.

SUMMARY OF THE INVENTION

It is an object of this invention to joint the armour of a submarine cable, retaining a high proportion of the tensile strength even at the joint, without allowing significant elongation of the core to occur.

According to the invention there is provided an armoured submarine cable having at least one of its ends terminated for the transmission of tension, wherein the termination comprises concentric sleeves which are alternately interleaved with the layers of armour, each sleeve which lies outside a layer of armour being swaged (that is crushed, for example in a hydraulic press, so that irreversible flow of the metal in the sleeves is caused) onto the next inner sleeve so as to grip the respective layer of armour there between, every layer of armour being so gripped, and at least one of the sleeves having an outwardly turned rim capable of transmitting tension.

This invention is further defined in the claims.

BRIEF DESCRIPTION OF THE DRAWINGS

The invention will now be described by way of example with reference to the accompanying drawings in which.

DETAILED DESCRIPTION OF THE PREFERRED EMBODIMENT

Figure 1:
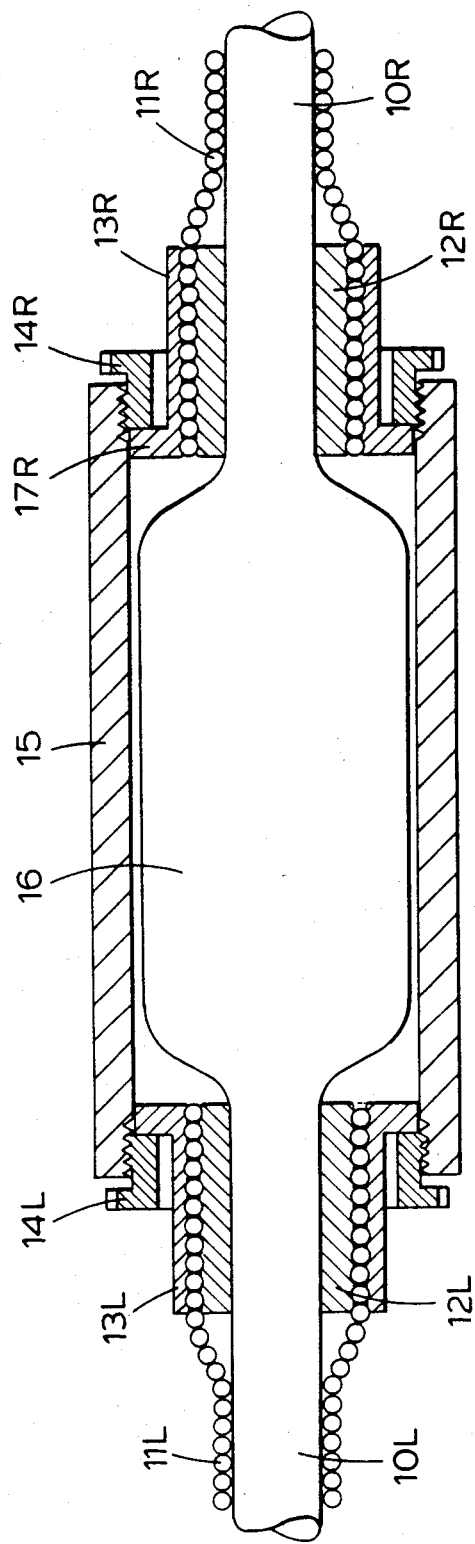
FIG. 1 illustrates a joint according to the invention.

FIG. 1 illustrates a joint, according to the invention, between a right-hand cable and a left-hand cable. Since both cables comprise the same integers, the same numeral will be used with the suffix "L" to denote the left-hand cable and "R" the right-hand cable.

The joint is formed from cables having cores 10L and 10R with surrounding armour 11L and 11R. The cores 10L and 10R are connected in a core joint 16 which is conventional for the cores. In order to form the core-joint 16, the armour has been removed and the armour-joint according to the invention constitutes the armour over the joint.

The armour-joint comprises inner sleeves 12L and 12R which fit loosely over cores 10L and 10R and inside armour 11L and 11R. Outer sleeves 13L and 13R fit over the armour 11L and 11R and each armour is gripped in the annulus between its sleeves.

The armour-joint also includes a connector tube 15 which contains the core-joint 16 and part of the sleeves. The sleeves are held in the tube against tension by stop members 14L and 14R which screw into the ends of the connector tube 15 and engage with rims 17L and 17R.

If the tension rises on, say, the left hand cable, this will be carried by the armour 11L and transferred to the sleeve 13L at its end. The tension is conveyed via rim 17L and stop members 14L into the connector tube 15. Similarly, the tension is conveyed into the armour 11R of the right hand cable. Thus, the armour-joint performs the function of the armour at the place where two cables are jointed together. While the joint is weaker than the armour, its breaking tension is at least 90 percent of the breaking tension of the armour.

Figure 2:
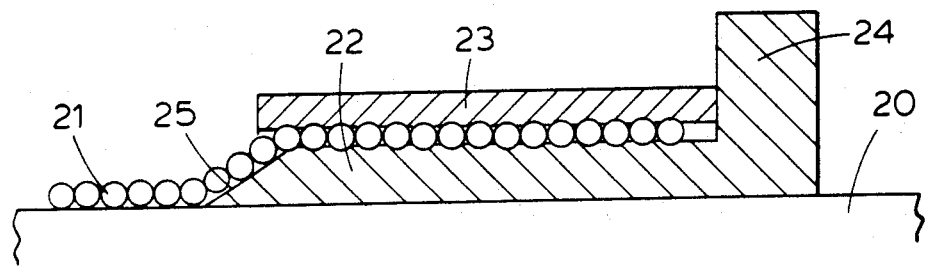
FIGS. 2–4 are cross-sections from the wall of the core outwards, illustrating three different terminations each on the end of a cable with a single layer of armour.

The termination shown in FIG. 2 comprises an inner sleeve 22 which fits between the armour 21 and the wall 20 of the core of a cable. An outer sleeve 23 fits over the armour 21 and it is swaged inwardly so that the armour is gripped for the transfer of tension. The inner sleeve 22 has a rim 24 to engage with the stop member (not shown in FIG. 2) when the joint is assembled.

The inner sleeve 22 has a taper 25 to facilitate its insertion under the armour during assembly. The taper has no further function during the life of the joint.

Figure 3:
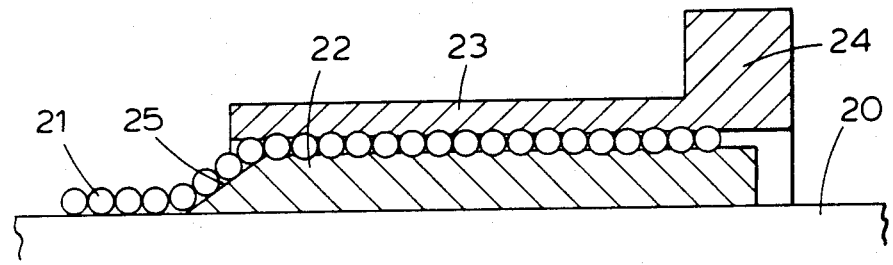
Figure 4:
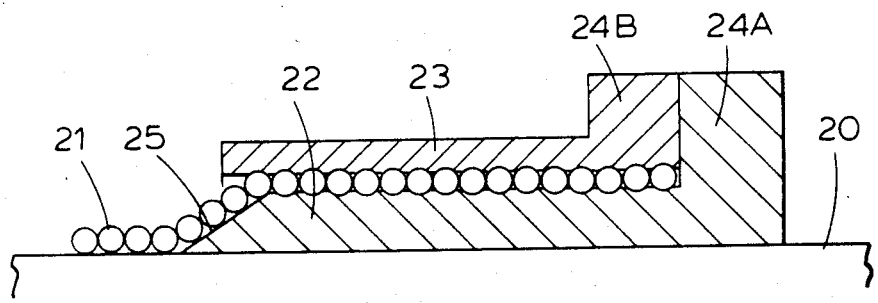

The termination shown in FIG. 3 differs from that of FIG. 2 in that the rim 24 is on the outer sleeve 23. In FIG. 4 there are two rims, namely rim 24A on the inner sleeve 22 and rim 24B on the outer sleeve 23. The advantage of the termination shown in FIG. 4 is that two rims provide transfer of tension from the stop member (not shown in FIG. 4) into both sleeves. Thus the tension attempts to pull both off both sleeves 22 and 23 at the same time and it is believed that this gives a stronger structure than FIGS. 2 and 3 (where the tension could pull off only the sleeve with a rim).

The terminations shown in FIGS. 2, 3 and 4 are all produced as follows: The armour is removed from the end of the cable to uncover enough core to form the core-joint. The stop members (not shown in FIGS. 2-4) are placed on the cables, followed by the outer sleeve 23 and then the inner sleeve 22. The inner sleeve 22 is then inserted under the armour; the taper 25 assists this operation. Finally, the outer sleeve 23 is placed over the armour and swaged.

Figure 5:
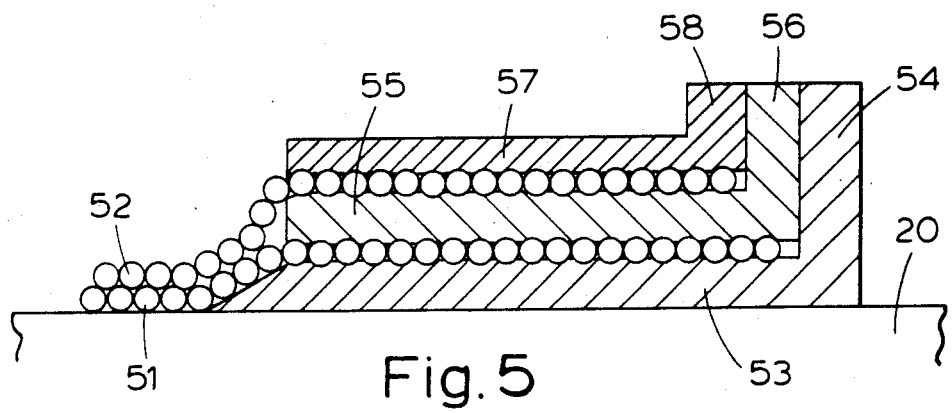
FIGS. 5 and 6 are similar to FIGS. 2–4, each illustrating a termination on a cable with two layers of armour
Figure 6:
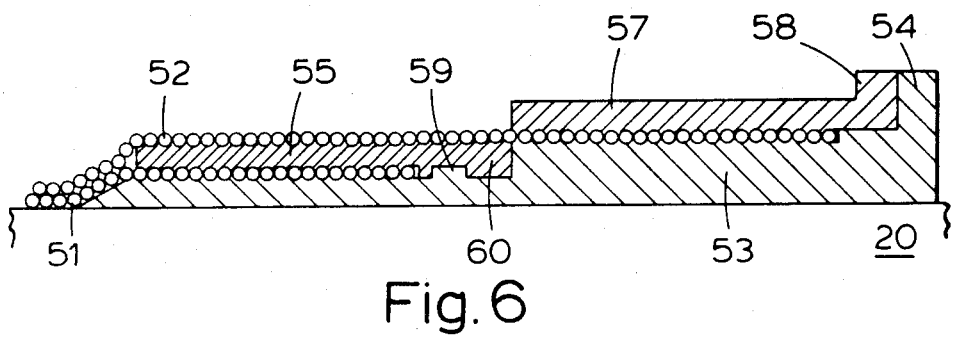

The terminations illustrated in FIGS. 5 and 6 include three sleeves for a cable with two layers of armour. The termination shown in FIG. 5 can be regarded as a modification of FIG. 4. The cable has two layers of armour, an inner layer 51 and an outer layer 52. Inner sleeve 53, with rim 54, fits between the inner armour 51 and the wall 20 of the core. Middle sleeve 55, with rim 56, fits between the two layers of armour 51 and 52. Outer sleeve 57, with rim 58, fits over outer armour 52. In making the assembly, the parts are located and both swages are made simultaneously.

The termination of FIG. 6 differs from that of FIG. 5 in that the middle sleeve 55 and the outer sleeve 57 do not overlap. The inner armour 51 extends only over half of the inner sleeve 53 where it is swaged between the middle sleeve 55 and the inner sleeve 53. A groove 60 on the inner sleeve 53 assists transfer of tension because the swaging creates a lock ring on the middle sleeve 55 and the inner sleeve 53. The inner sleeve 53 has rim 54 and the outer sleeve has rim 58.

Figure 7:
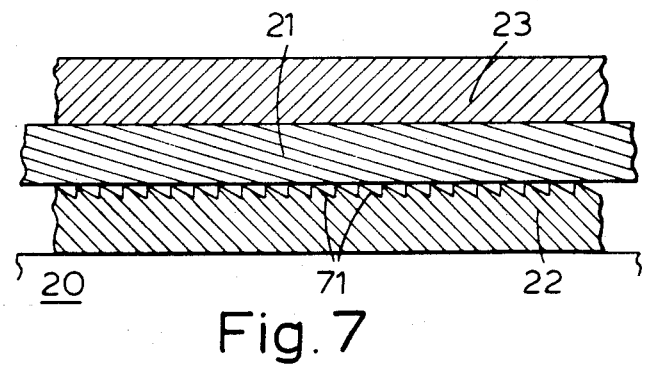
FIG. 7 illustrates circumferential grooves which enhance the grip of the sleeves on the armour. (Part only of the sleeves are shown, on an enlarged scale.)

FIG. 7 illustrates, before swaging, an arrangement of circumferential grooves which can be incorporated into any of the configurations illustrated above so as to improve the grip of the concentric sleeves on the layers of armour. The inner sleeve 22 shows the circumferential grooves 71 on its outer surface. Each groove is V-shaped in cross-section, having a radial and a non-radial face. Such a cross-section is not a necessary feature however and grooves of a different cross-section may also be found effective. Furthermore, it is not necessary that the grooves are located as shown but may be in any surface of a concentric sleeve which is in contact with a layer of armour.

It may be noted that the armour 21 shown in FIG. 7 is represented in a manner different from that in which the armour shown in FIGS. 1 to 6 is represented. It is generally the case that the armour of a submarine cable comprises a helix or helices with a lay angle of about 10°. The armour shown in all of FIGS. 1 to 7 is of this type. The difference in representation referred to should be taken to be only that and should not be taken to indicate differences in configuration of the armour.

It has been found that incorporating abrasives, e.g. silicon carbide grit, to the inner surfaces of the outer and/or middle sleeves may improve the tensile strength of the termination.

Terminations made according to embodiments of the invention have the advantage that all the wires of an armour layer are gripped during a single swaging operation. This has the result that a tensile load which is subsequently applied to the submarine cable will be substantially evenly distributed amongst the armour wires of a layer and will not be taken preferentially by a small proportion of the wires.

The joint, e.g. as shown in FIG. 1, is conveniently assembled in three stages as follows:

In the first stage a termination, e.g. as illustrated in any one of FIGS. 2–6, is applied to the end of each cable. It is usually appropriate to use two similar terminations but different terminations may be used if desired, e.g. for joining single armour cable to double armour cable. Since the stop member will not pass over the rim it is important to place the stop member on each cable before forming the termination. The connection tube, which will pass over the rims, is conveniently added last.

In the second stage the core-joint is formed and sealed.

In the third stage the connector tube is positioned over the core-joint and the rims, and the stop members are screwed into the connector tube far enough to bear against the rims without damaging compression of the core-joint. As a final precaution, not illustrated in any drawing, the connector tube and stop members may be drilled and tapped so that grub screws can be inserted to prevent further rotation of the stop members.

Joints according to embodiments of the invention have the advantage, particularly important in the jointing of optical fibre cables, that the position of the tensile wires is adjustable relative to the joint after the wires have been secured in a termination. It is the purpose of the tensile load-carrying armour wires to limit or avoid any stress which might affect the core. However, there are two factors which can lengthen the armour wires relative to this;

(i) a bedding down of the wires when a load is applied, for example, by a "marauding" trawler, and (ii) the inaccuracy with which the exact position of the termination of the armour wires can be determined in practice.

Both these factors can be overcome by adjusting the position of the rim or rims, and the respective stop members, in the connector tube after the joint has been assembled. The core-joint can even be placed under a slight degree of compression (though of course less than that sufficient to damage the core-joint) against the potential appearance of load on the armour wires after the cable has been laid.

I claim:

1. An armoured submarine cable comprising a core including an optical fibre, strengthening members, insulation and a water seal, at least one layer of armour disposed around the core and having at least one armour termination for the transmission of tension, wherein the termination comprises:
  concentric sleeves which are alternately interleaved with a layer of armour,
  each sleeve which lies outside a layer of armour being swaged onto the next inner sleeve so as to grip the respective layer of armour therebetween, every layer of armour being so gripped, and
  at least one of the sleeves having an outwardly turned rim capable of transmitting tension.

2. An armoured submarine cable according to claim 1 further comprising:
  a connector tube and a stop member retained on the cable by the outwardly turned rim,
  the stop member having means for releasable engagement with the connector tube.

3. An armoured submarine cable according to claim 2 in which the engaged relative longitudinal locations of the stop member and connector tube are variable.

4. An armoured submarine cable according to claim 2 in which the means for releasable engagement comprises threaded portions on the stop member and connector tube.

5. An armoured submarine cable according to claim 2 in which the stop member has an externally threaded portion and the connector tube has a cooperating internally threaded portion.

6. An armoured submarine cable having at least one layer of armour and having at least one of its ends terminated for the transmission of tension, wherein the termination comprises:
  concentric sleeves which are alternately interleaved with a layer of armour,
  each sleeve which lies outside a layer of armour being swaged onto the next inner sleeve so as to grip the respective layer of armour therebetween, every layer of armour being so gripped, and
  at least one of the sleeves having an outwardly turned rim capable of transmitting tension,
  wherein the cable has two layers of armour.

7. An armoured submarine cable according to claim 6 wherein each sleeve has an outwardly turned rim capable of transmitting tension.

8. An armoured submarine cable according to claim 6 wherein the termination comprises:
  three concentric sleeves, the sleeves being arranged so that one of said sleeves is an inner sleeve positioned inside all the armour, another of said sleeves is a middle sleeve positioned between the two layers of armour and the third of said sleeves is an outer sleeve positioned outside the outer layer of armour,
  the inner and outer sleeves each having an outwardly turned rim on their ends nearer the end of the cable, said rims being contiguous,
  the inner sleeve comprising primary and secondary longitudinal sections arranged consecutively in an axial direction, the secondary section carrying the associated rim and having a greater external diameter than the primary section,
  wherein the inner layer of armour is gripped between the middle sleeve and the primary section of the inner sleeve and the outer layer of armour is gripped between the outer sleeve and the secondary section of the inner sleeve.

9. A joint for armour connection of armoured submarine cables that comprise a core including an optical fibre, strengthening members, insulation and a water seal and at least one layer of armour disposed around the core that has a termination for transmission of tension, said termination including:
  a first sleeve disposed inwardly of the armour layer and a second sleeve disposed outwardly of the armour layer,
  the armour layer being secured between the first and second sleeves,
  a connector tube,
  at least one of the sleeves having an upturned rim, and
  a stop member retained on the cable by the upturned rim, the stop member having means for releasable engagement with the connector tube.

10. A joint according to claim 9 in which the engaged relative longitudinal locations of the stop member and connector tube are variable.

11. A joint according to claim 9 in which the means for releasable engagement comprises threaded portions on the stop member and connector tube.

12. A joint according to claim 11 in which the stop member has an externally threaded portion and the connector tube has a cooperating internally threaded portion.

13. An armoured submarine cable comprising:
  a core including an optical fibre, strengthening members, insulation and a water seal;
  at least one layer of armour including tensile steel wires disposed around the core and
  an armour termination for the transmission of tension, the termination including:
  a first sleeve disposed inwardly of the armour layer,
  a second sleeve disposed outwardly of the armour layer and inwardly swaged to grip the armour between the first and second sleeves, and
  an outwardly directed flange on at least one of the sleeves.

14. An armoured submarine cable according to claim 13 further comprising:
  a stop member retained on the cable by the flange and a connector tube,
  the stop member having means for engagement with the connector tube, said means being adjustable to enable the relative longitudinal positions of the flange and connector tube to be varied when the stop member and connector tube are engaged.

15. An armoured submarine cable according to claim 14 further comprising means for locking the stop member relative to the connector tube.

16. An armoured submarine optical fibre cable joint comprising:
  a connector tube,
  an optical fibre cable core including strengthening members and a core joint, said core joint being housed within and between two ends of said connector tube which is capable of carrying tensile forces; and
  at least one cable armour termination fixedly secured to cable armour passing from one end thereof and retained within a respective end of said connector tube for transferring tensile loads from said armour to said connector tube while yet permitting it to be adjusted in location with respect to said connector tube and/or with respect to said core joint.

17. An armoured submarine optical fibre cable joint as in claim 16 wherein said termination comprises:
- an inner metallic sleeve carrying said cable armour on an outer circumference thereof;
- an outer metallic sleeve encompassing at least a portion of said inner metallic sleeve and swaged theretowards and into said cable armour;
- at least one of said sleeves having a radially extending rim portion; and
- a stop member threadedly secured to one end of said housing and retaining said rim portion therebehind so as to permit relative rotation between said stop member and said rim portion.

18. An armoured submarine optical fibre cable joint as in claim 17 wherein said stop member may be axially adjusted so as to retain the termination at an axially adjustable position within said housing.

19. An armoured submarine optical fibre cable joint as in claim 16 comprising a pair of said terminations, one being located at each end of said housing.

* * * * *